(12) United States Patent
Mrotek

(10) Patent No.: US 7,254,915 B2
(45) Date of Patent: Aug. 14, 2007

(54) ALLIGATOR CLIP HOLDER FOR SUPPORTING A FISHING ROD

(75) Inventor: John Adam Mrotek, 1405 N. 5th, Manitowoc, WI (US) 54220

(73) Assignee: John Adam Mrotek, Manitowoc, WI (US)

( * ) Notice: Subject to any disclaimer, the term of this patent is extended or adjusted under 35 U.S.C. 154(b) by 0 days.

(21) Appl. No.: 11/363,019

(22) Filed: Feb. 27, 2006

(65) Prior Publication Data

US 2006/0196101 A1 Sep. 7, 2006

(51) Int. Cl.
*A01K 97/10* (2006.01)
(52) U.S. Cl. ............... 43/21.2; 248/540; 248/512; 248/535; 248/229.1; 248/229.13; 248/227.1
(58) Field of Classification Search ............ 43/21.2; 248/540, 512, 514, 515, 534, 535, 538, 229.1, 248/229.12, 229.13, 229.14, 229.15, 229.16, 248/229.22, 229.23, 229.24, 229.25, 229.26, 248/226.11, 227.1; 24/335, 338, 343, 344, 24/345, 349
See application file for complete search history.

(56) References Cited

U.S. PATENT DOCUMENTS

| | | | | |
|---|---|---|---|---|
| 535,692 A | * | 3/1895 | France | 248/534 |
| 691,364 A | * | 1/1902 | Denckia | 24/338 |
| 697,127 A | * | 4/1902 | Bogendoerfer | 24/349 |
| 840,241 A | * | 1/1907 | Nootbaar | 248/515 |
| 947,282 A | * | 1/1910 | Hall | 248/515 |
| 1,015,717 A | * | 1/1912 | Shimer | 248/514 |
| 1,283,511 A | * | 11/1918 | Heidtmann | 43/21.2 |
| 1,534,642 A | * | 4/1925 | Hoagland | 248/514 |
| 1,574,695 A | * | 2/1926 | Riley | 248/229.13 |
| 1,735,212 A | * | 11/1929 | Pawsat | 248/229.24 |
| 1,774,775 A | * | 9/1930 | Weitz, Jr. | 248/229.26 |
| 1,789,509 A | * | 1/1931 | Bergstrom | 248/516 |
| 2,063,924 A | * | 12/1936 | Hanko | 248/229.23 |
| 2,110,037 A | * | 3/1938 | De Rosa | 248/229.15 |
| 2,146,350 A | * | 2/1939 | Roberts | 248/229.13 |
| 2,171,665 A | * | 9/1939 | Meltzer | 24/338 |
| 2,176,352 A | * | 10/1939 | Mchuron | 248/514 |
| 2,314,747 A | * | 3/1943 | White | 43/21.2 |
| 2,416,828 A | * | 3/1947 | Hamre | 248/515 |
| 2,452,116 A | * | 10/1948 | Felton | 248/514 |
| 2,466,801 A | * | 4/1949 | Fong | 248/538 |
| 2,475,193 A | * | 4/1949 | Miller | 43/21.2 |
| 2,489,875 A | * | 11/1949 | Embree | 24/343 |
| 2,510,181 A | * | 6/1950 | Jury | 24/521 |

(Continued)

FOREIGN PATENT DOCUMENTS

EP    1060665 A2  * 12/2000

(Continued)

*Primary Examiner*—Darren W. Ark

(57) ABSTRACT

An alligator clip holder is provided for supporting and retaining at least one fishing rod on a support device. The holder includes a first clip member and a second clip member pivotally connected to each other by a pivot pin. A resilient member is disposed about the pivot pin with two opposite ends in contact against respective surfaces of the first and second clip members so as to permit clamping attachment of the first and second clip members to a support device. A retaining bar assembly is rotatably and slidably positioned on a top end of one of the first and second clip members for supporting and retaining at least one fishing rod thereon.

4 Claims, 3 Drawing Sheets

U.S. PATENT DOCUMENTS

| | | | | |
|---|---|---|---|---|
| 2,542,253 A * | 2/1951 | King | | 43/21.2 |
| 2,546,280 A * | 3/1951 | Stein | | 43/21.2 |
| 2,547,507 A * | 4/1951 | Sucksdorf | | 248/514 |
| 2,554,199 A * | 5/1951 | Lewis | | 24/343 |
| 2,693,660 A * | 11/1954 | Nebergall et al. | | 43/21.2 |
| 2,798,684 A * | 7/1957 | Walden | | 248/511 |
| 2,914,829 A * | 12/1959 | Willemain | | 248/229.15 |
| 2,981,509 A * | 4/1961 | Messenger et al. | | 248/538 |
| 2,988,311 A * | 6/1961 | Bow | | 248/514 |
| 3,056,412 A * | 10/1962 | Wolfe | | 248/229.13 |
| RE25,387 E * | 5/1963 | Hendon | | 248/540 |
| 3,194,524 A * | 7/1965 | Trumbull | | 248/229.15 |
| 3,295,812 A * | 1/1967 | Schneider et al. | | 248/229.16 |
| 3,374,980 A * | 3/1968 | Chovan | | 248/229.15 |
| 3,380,698 A * | 4/1968 | Goldberg et al. | | 248/229.26 |
| 3,463,440 A * | 8/1969 | Libby, Jr. | | 248/229.24 |
| 3,484,066 A * | 12/1969 | Aunspaugh | | 43/21.2 |
| 3,543,633 A * | 12/1970 | Batten | | 248/229.23 |
| D219,970 S * | 2/1971 | Salzmann | | 43/21.2 |
| 3,564,753 A * | 2/1971 | Fravel | | 43/21.2 |
| 3,747,166 A * | 7/1973 | Eross | | 248/229.26 |
| 4,040,547 A * | 8/1977 | Dickey | | 248/229.13 |
| 4,097,017 A * | 6/1978 | Hazlitt | | 248/515 |
| 4,106,811 A * | 8/1978 | Hernandez | | 43/21.2 |
| 4,115,966 A * | 9/1978 | DeLee | | 248/229.26 |
| 4,121,798 A * | 10/1978 | Schumacher et al. | | 248/229.26 |
| 4,141,524 A * | 2/1979 | Corvese, Jr. | | 248/229.12 |
| 4,186,903 A * | 2/1980 | Fazakerley | | 248/229.16 |
| 4,193,572 A * | 3/1980 | Horiuchi et al. | | 248/535 |
| 4,211,380 A * | 7/1980 | Lillegard et al. | | 248/229.15 |
| 4,270,724 A * | 6/1981 | McMullen | | 248/534 |
| 4,528,768 A * | 7/1985 | Anderson | | 43/21.2 |
| 4,658,533 A * | 4/1987 | Mendoza | | 43/21.2 |
| 4,828,210 A * | 5/1989 | Anderson et al. | | 248/229.15 |
| D305,026 S * | 12/1989 | Wolf | | D14/229 |
| 4,895,330 A * | 1/1990 | Anstead | | 248/229.23 |
| 4,903,929 A * | 2/1990 | Hoffman | | 248/229.15 |
| 5,037,052 A * | 8/1991 | Crisp et al. | | 248/229.23 |
| 5,322,253 A * | 6/1994 | Stevens | | 248/229.15 |
| 5,489,075 A * | 2/1996 | Ible | | 248/229.23 |
| 5,538,167 A * | 7/1996 | Winner | | 248/229.14 |
| 5,542,636 A * | 8/1996 | Mann et al. | | 248/229.26 |
| 5,571,228 A * | 11/1996 | McMurtrie | | 43/21.2 |
| 5,573,167 A * | 11/1996 | Bebb et al. | | 43/21.2 |
| 5,582,377 A * | 12/1996 | Quesada | | 248/229.12 |
| 5,632,112 A * | 5/1997 | Steinborn | | 43/21.2 |
| 5,703,306 A * | 12/1997 | Liao | | 248/229.13 |
| 5,910,004 A * | 6/1999 | Antosh | | 43/21.2 |
| 6,123,305 A * | 9/2000 | Lukasavitz | | 248/292.12 |
| 6,138,976 A * | 10/2000 | Fahringer, Sr. | | 248/534 |
| 6,253,484 B1 * | 7/2001 | O'Connor | | 43/21.2 |
| 6,421,948 B1 * | 7/2002 | Craig | | 43/21.2 |
| 6,631,876 B1 * | 10/2003 | Phillips | | 248/229.16 |
| 6,672,559 B1 * | 1/2004 | Boldia | | 248/538 |
| 6,837,472 B1 * | 1/2005 | Beutz | | 248/229.1 |
| 7,040,583 B1 * | 5/2006 | Holland et al. | | 248/226.11 |
| 2005/0005500 A1 * | 1/2005 | Howley | | 43/21.2 |

FOREIGN PATENT DOCUMENTS

| | | | |
|---|---|---|---|
| GB | 2333020 A | * | 7/1999 |
| GB | 2365914 A | * | 2/2002 |
| GB | 2416975 A | * | 2/2006 |
| JP | 2000-32897 A | * | 2/2000 |
| JP | 2000-139313 A | * | 5/2000 |
| JP | 2001-292675 A | * | 10/2001 |

* cited by examiner

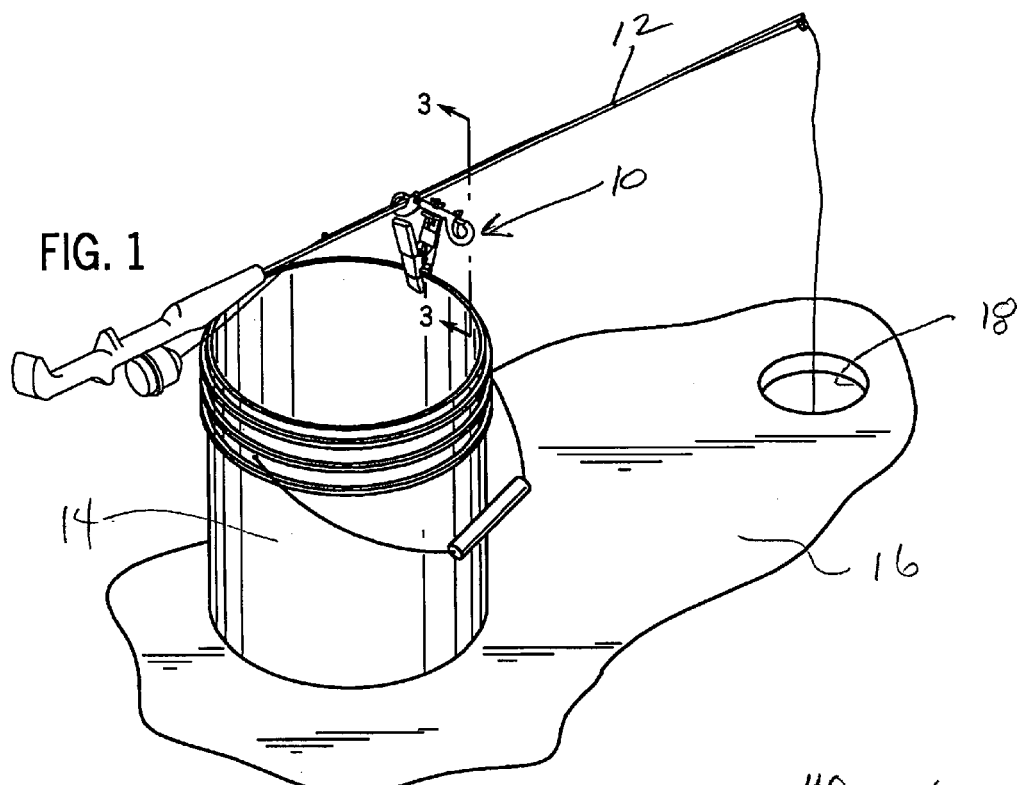
FIG. 1
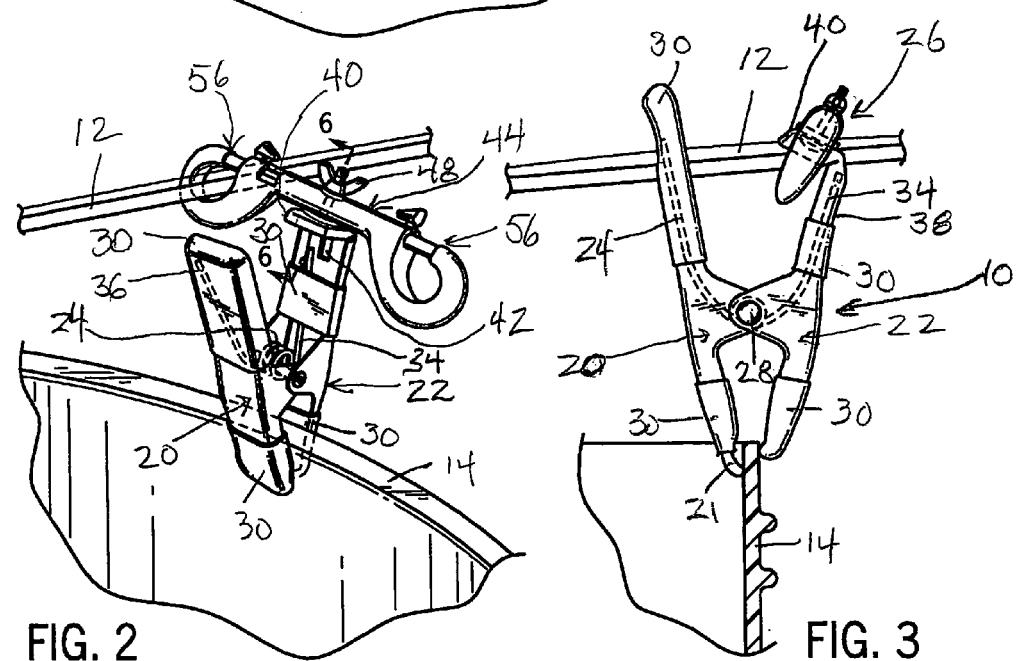
FIG. 2
FIG. 3

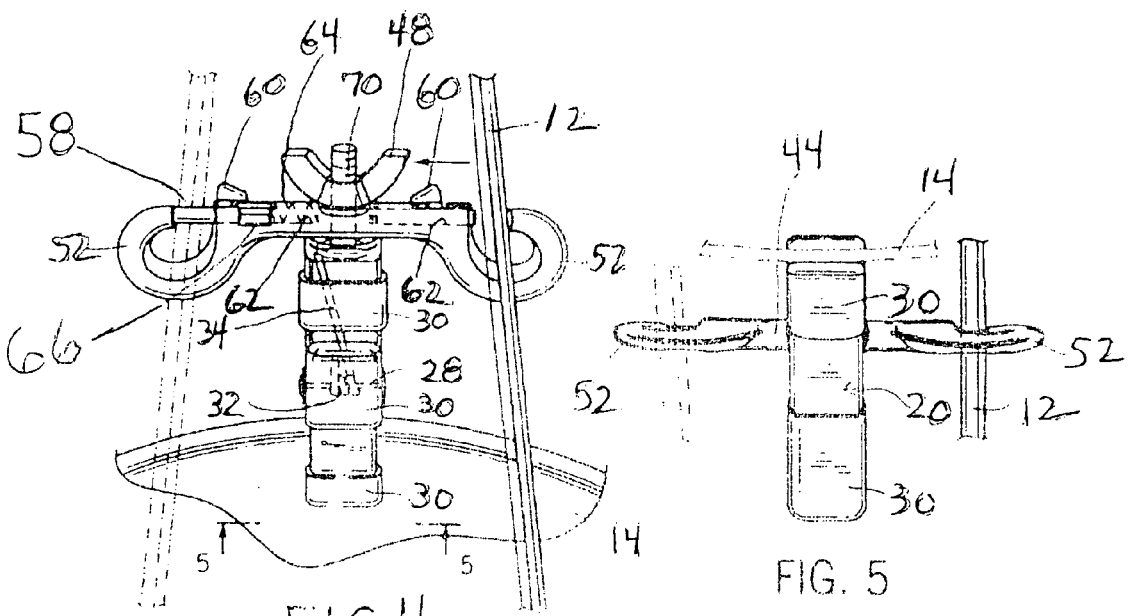
FIG. 4 AMENDED
FIG. 5
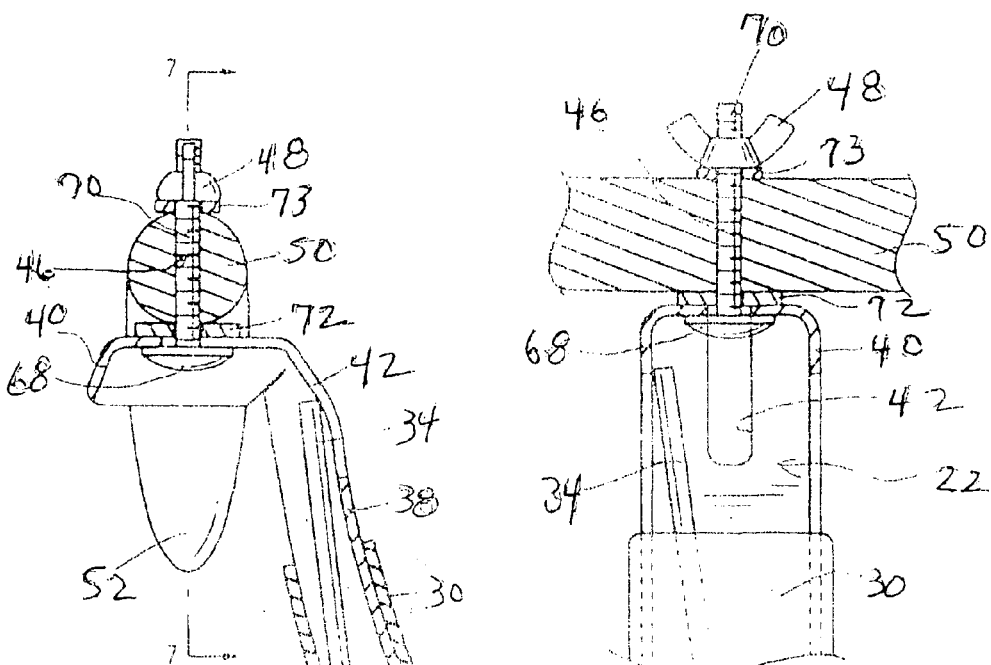
FIG. 6
FIG. 7

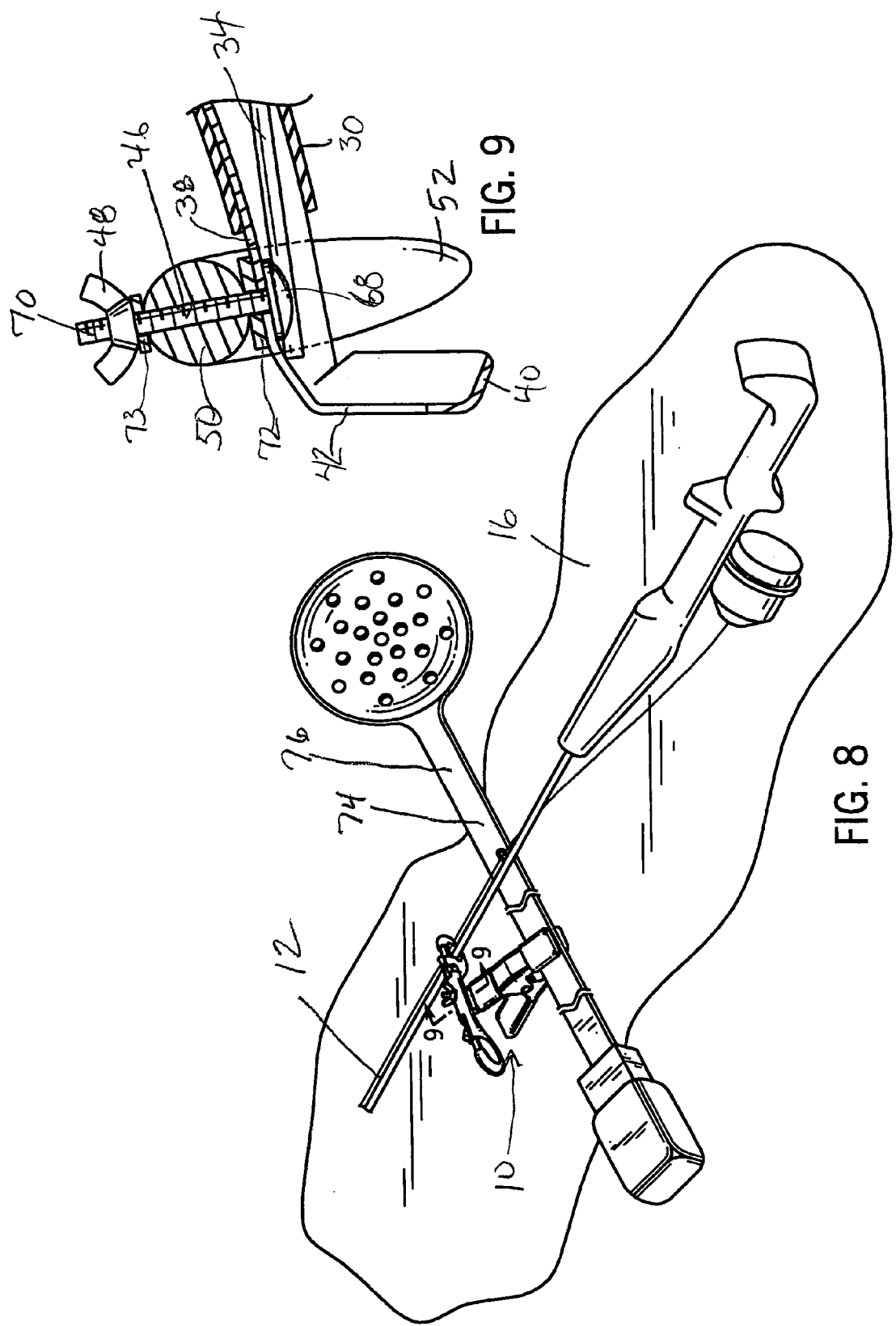

ALLIGATOR CLIP HOLDER FOR SUPPORTING A FISHING ROD

FIELD OF THE INVENTION

The present invention relates generally to an alligator clip holder used for supporting and retaining objects therefrom, and, more particularly, pertains to an alligator clip holder having a preferred utility in supporting and retaining a fishing rod from a support device.

BACKGROUND OF THE INVENTION

When ice fishing, a fisherman will occasionally leave an ice fishing hole unattended with the result that a powerful strike by a fish will pull the entire fishing rod into and through the hole so that the fishing rod is lost. A similar result may occur in open water fishing to an unattended fishing rod lying on a pier or extending from a boat. Because the loss of one's fishing rod along with a lure can be a sizable expense to replace, it is desirable to provide a solution which will inexpensively and efficiently insure the security of one's fishing rod in various fishing environments.

SUMMARY OF THE INVENTION

It is a general object of the present invention to provide a protective device for safeguarding one's fishing rig from loss during fishing.

It is also an object of the present invention to provide a modified alligator clip which will temporarily anchor one's fishing rod to a support device such as a storage bucket, an ice fishing scooper/skimmer, a boat, a pier structure or the like.

It is another object of the present invention to provide an alligator clip holder which is capable of supporting and retaining a pair of fishing rods if desired.

It is a further object of the present invention to provide an alligator clip holder having a retaining bar which is adjustable relative to the alligator clip.

It is an additional object of the present invention to provide an alligator clip holder having a pair of closure devices on opposite ends of the retaining bar.

In one aspect in the invention, an alligator clip holder is provided for supporting and retaining at least one fishing rod on a support device. The holder includes a first clip member and a second clip member connected to each other by a pivot pin. A resilient member is disposed about the pivot pin with two opposite ends in contact against respective surfaces of the first and second clip members so as to permit clamping attachment of the first and second clip members to a support device. A retaining bar assembly is rotatably and slidably positioned on a top end of one of the first and second clip members for supporting and retaining at least one fishing rod thereon.

Various other objects, features and advantages of the invention will be made apparent from the following description taken together with the drawings.

BRIEF DESCRIPTION OF THE DRAWINGS

The drawings illustrate the best mode presently contemplated of carrying out the invention.

In the drawings:

FIG. 1 is a perspective view of an alligator clip holder used for supporting and retaining a fishing rod on a bucket used in ice fishing;

FIG. 2 is an enlarged, perspective view of the holder shown in FIG. 1;

FIG. 3 is an elevational view of the holder taken on line 3—3 of FIG. 1;

FIG. 4 is a front view of the holder in FIG. 2;

FIG. 5 is a view taken on line 5—5 of FIG. 4;

FIG. 6 is a sectional view taken on line 6—6 of FIG. 2;

FIG. 7 is a sectional view taken on line 7—7 of FIG. 6;

FIG. 8 is a perspective view of the holder used for supporting and retaining the fishing rod on an ice fishing skimmer/scooper; and FIG. 9 is a sectional view taken on line 9—9 of FIG. 8.

DETAILED DESCRIPTION OF THE INVENTION

Referring now to the drawings, FIGS. 1–7 illustrate an alligator clip holder embodying the present invention. In the preferred embodiment, the holder 10 is shown as being particularly useful in supporting and retaining a fishing rod 12 upon a storage bucket 14 disposed on an ice surface 16 adjacent an ice fishing hole 18. However, it should be appreciated that the holder 10 may also have other suitable applications.

The alligator clip holder 10 comprises a first clip member 20, a second clip member 22, a resilient member 24 and a retaining bar assembly 26.

The first clip member 20 and the second clip member 22 are constructed of metal and are pivotally connected to each other by a pivot pin 28. Bottom ends of both clip members 20, 22 and the top end of clip member 20 are provided with a protective covering 30. The resilient member 24 takes the form of a spring which has a coiled portion 32 (FIG. 4) disposed about the pivot pin 28. The resilient member 24 has two elongated ends 34, 36 extending from the coiled portion 32 and in contact with interior surfaces of the first and second clip members 20, 22, respectively. The bottom ends of the clip members 20, 22 are inclined and biased relative to each other to provide a clipping function so that the holder 10 can be firmly clipped on a support device such as the rim of bucket 14. In particular, the bottom end of clip member 20 has an inwardly extending lip 21 (FIG. 3) for improving gripping capability.

As seen best in FIGS. 2, 3, 6 and 7, the top end of the second clip member 22 has a main portion 38 and a bent portion 40 that faces inwardly towards the top end of first clip member 20. The second clip member 22 is formed with an elongated slot 42 which runs along the top end of main portion 38 and continues inwardly along part of the bent portion 40.

The retaining bar assembly 26 includes a retaining bar 44 which is adjustably positioned on the top end of second clip member 22 by an adjustment screw 46 and a wing nut 48. The retaining bar 44, as best seen in FIG. 4, has a straight middle section 50 integrally formed on opposite ends thereof with hooks 52 having gaps 54 that are selectively opened and closed by a pair of rotatable and slidable closure members 56 (FIG. 2). Each closure member 56 consists of a horizontal cylindrical post 58 having a finger-engaging, covered tab 60 extending generally upwardly therefrom. The middle section 50 includes a pair of internal recesses 62 for accommodating the posts 58 and a pair of coil springs (one being seen at 64) that engage ends of the post 58. A pair of latching pockets 66 are formed on front and rear sides of the middle section 50 for selectively receiving the tabs 60 on the closure members 56 when the closure members 56 are slidably pushed against the bias of springs 64 and rotated in the recesses 62 to latch the tabs 60 in the pockets 66. In FIG. 4, the closure member 56 on the left of the retaining bar 44 is shown in the closed position closing gap 54. The closure member 56 on the right of retaining bar 44 is illustrated in the open position leaving gap 54 open. Here, the tab 60 is shown latched in the pocket 66 against the bias of spring 64 so as to allow easier entry of the fishing rod 12 onto the interior surfaces of hooks 52. Closure members 56 can be placed in the open or closed positions simultaneously or one at a time as desired.

Referring to FIGS. 6 and 7, the adjustment screw 46 includes a head 68 having a threaded shaft 70 which passes through a central hole formed in the middle section 50 of retaining bar 44 as well as through an upper portion of slot 42. Head 68 engages the underside of bent portion 40. The end of threaded shaft 70 is threadably received in wing nut 48 which is covered with a protective coating. A washer 72 surrounds the threaded shaft 70 and is positioned between the top of the bent portion 40 and the bottom of middle section 50. In addition, a lock washer 73 encircles threaded shaft 70 and lies between the wing nut 48 and the top of middle section 50. Loosening and tightening of the wing nut 48 will enable the retaining bar 44 to be rotatably adjusted, if desired, about the longitudinal axis of the threaded shaft 72. In addition, manipulation of the wing nut 48 will permit the retaining bar 44 to be positioned in the upper portion of slot 42 as illustrated in FIGS. 1–7, or the lower portion of the slot 42 as depicted in FIGS. 8 and 9 to be described below.

In an alternative embodiment shown in FIGS. 8 and 9, the alligator clip holder 10 is clipped to a handle 74 of an ice fishing skimmer/scooper 76 that lies on the ice surface 16 adjacent the ice fishing hole (not shown). In this embodiment, the retaining bar 44 has been positioned on the lower portion of slot 42, as clearly depicted in FIG. 9, so that the fishing rod 12 may be supportively retained in a properly oriented hook 52 on one end of the retaining bar 44. In use with the bucket 14 or skimmer/scooper 76, the retaining bar 44 is capable of supporting and retaining one or two fishing rods as shown in FIGS. 4 and 5.

It should now be appreciated that the present invention provides a unique alligator clip holder 10 which temporarily anchors at least one fishing rod 12 to a support device so that the fishing rod 12 will not be drawn tip end first into a body of water and lost. The retaining bar 44 is designed to be rotatably and slidably positioned relative to the clip members 20, 22 to suit the particular application. Although not shown, it should be understood that the holder 10 may also be clipped to a pier structure or a boat for supporting and protecting fishing rods 12 in an open water environment. The holder 10 may have other applications beyond that of supporting and retaining fishing rods 12.

While the invention has been described with reference to a preferred embodiment, those skilled in the art will appreciate that certain substitutions, alterations and omissions may be made without departing from the spirit thereof.

What is claimed is:

1. A portable multi-fishing rod holder comprising:
   - (a) a clip comprising a first clip member with top and bottom ends and a second clip member with top and bottom ends, the clip members being pivotally connected to each other, the bottom ends of the clip members being biased toward each other by a first spring, the first clip member having a vertical slot therein which begins adjacent the top end and extends along an axis of the clip toward the bottom end;
   - (b) a retaining bar assembly comprising a retaining bar with a first end, a second end, and a middle portion therebetween, the retaining bar having a hook at each end, the hook comprising a gap that is selectively opened and closed by a closure member located in an internal recess of the middle portion, the closure member being biased to close the hook by a second spring located in the internal recess, the closure member including a post that is rotatable and slidable within the internal recess of the middle section, the post having a tab extending therefrom to allow a user to move the closure member, the middle portion of the retaining bar includes slots on an exterior surface thereof that extend along an axis of the retaining bar and communicate with the internal recesses;
   - (c) means for attaching the retaining bar to the clip at the vertical slot, the means for attaching extending through both the vertical slot and retaining bar in order to attach them together, the means for attaching capable of moving along a length of the slot to adjustably position the retaining bar relative to the clip, wherein the means for attaching can be loosened so as to allow adjustment of the relative positioning between the retaining bar and the clip by selectively positioning the means for attaching at the desired location along the vertical slot and then the means for attaching can be tightened so as to hold the desired relative positioning between the retaining bar and the clip.

2. The portable multi-fishing rod holder as recited in claim 1, wherein the middle portion includes a pair of latching pockets that both communicate with and extend transversely relative to a respective one of the slots, one of the latching pockets is formed on a front surface of the retaining bar and the other of the latching pockets is formed on a rear surface of the retaining bar, wherein the hooks can be opened by movement of the tabs of the posts within the slots against the bias of the second springs and then rotated into the latching pockets to hold the hooks open, and wherein the hooks can be closed by rotating the tabs out of the latching pockets and into the slots and allowing the second springs to bias the posts to close the gaps of the hooks.

3. The portable multi-fishing rod holder as recited in claim 1, wherein the second clip member has an inward bend at the bottom end for improving gripping capability.

4. The portable multi-fishing rod holder as recited in claim 1, wherein the means for attaching the retaining bar to the clip comprises a threaded fastener, a lock washer, and a wing nut.

* * * * *